United States Patent
Park

(10) Patent No.: US 8,698,921 B2
(45) Date of Patent: Apr. 15, 2014

(54) AUDIO PROCESSING DEVICE, AUDIO PROCESSING METHOD, PROGRAM, AND AUDIO ACQUISITION APPARATUS

(75) Inventor: Kwangsoo Park, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 222 days.

(21) Appl. No.: 13/373,097

(22) Filed: Nov. 4, 2011

(65) Prior Publication Data

US 2012/0127343 A1 May 24, 2012

(30) Foreign Application Priority Data

Nov. 24, 2010 (JP) ................................ 2010-261522

(51) Int. Cl.
*H04N 5/217* (2011.01)
(52) U.S. Cl.
USPC .......................................................... 348/241
(58) Field of Classification Search
USPC ......... 348/231.4, 241; 381/94.1–94.9; 700/94
See application file for complete search history.

(56) References Cited

U.S. PATENT DOCUMENTS 7,831,140 B2 * 11/2010 Park et al. ..................... 396/133
8,379,110 B2 * 2/2013 Masuda ..................... 348/231.4
2009/0167905 A1 * 7/2009 Ishibashi et al. .............. 348/241
2011/0063461 A1 * 3/2011 Masuda .................... 348/208.11
2011/0234848 A1 * 9/2011 Matsumoto et al. ........ 348/231.4
2012/0027216 A1 * 2/2012 Tirry et al. ..................... 381/57

FOREIGN PATENT DOCUMENTS

| JP | 2005-228400 A | 8/2005 |
| JP | 2006-279185 A | 10/2006 |
| JP | 2008-058343 A | 3/2008 |
| JP | 2009-075536 A | 4/2009 |

* cited by examiner

*Primary Examiner* — Aung S Moe
*Assistant Examiner* — Amy Hsu
(74) *Attorney, Agent, or Firm* — McGinn IP Law Group, PLLC

(57) ABSTRACT

In an audio-accompanying moving-image taking apparatus, a noise period setting unit sets a second period with respect to an audio signal acquired by image-taking. The second period is a period between the endpoint of a first period which is a predetermined period starting from the timing when a drive instruction is made to a drive unit for driving a lens and the point in time when the drive unit stops driving according to the drive instruction. A noise level estimation unit estimates a noise level using the signal present in the second period set by the noise period setting unit. A noise suppression unit suppresses noise from the signal present in the second period using the noise level estimated by the noise estimation unit.

6 Claims, 6 Drawing Sheets

AUDIO PROCESSING DEVICE, AUDIO PROCESSING METHOD, PROGRAM, AND AUDIO ACQUISITION APPARATUS

CROSS-REFERENCE TO RELATED APPLICATIONS

The disclosure of Japanese Patent Application No. 2010-261522 filed on Nov. 24, 2010 including the specification, drawings and abstract is incorporated herein by reference in its entirety.

BACKGROUND

The present invention relates to a technology which suppresses noise, in particular, noise caused by an operation of a drive device from an audio signal.

There have been known methods for estimating the noise level of an audio signal containing noise not only in the no-audio period but also in the audio period. Among known methods for estimating the noise level in the audio period is a method of calculating the chronological minimum value or average value of a smoothed signal power spectrum in the audio period as an estimated noise level in the audio period (Japanese Unexamined Patent Publication No. 2009-75536).

For example, noise estimation in the audio period is performed on an audio signal acquired by an image taking apparatus having a function of taking an audio-accompanying moving image. This is because such apparatuses include a drive device for driving components such as a focus mechanism, a zoom mechanism, an aperture mechanism, and a shutter mechanism and, when these mechanisms are driven during image taking, noise caused by the drive operation of the drive device enters an audio signal.

Japanese Unexamined Patent Publication No. 2006-279185, Japanese Unexamined Patent Publication No. 2005-228400, and Japanese Unexamined Patent Publication No. 2008-058343 each disclose a method for suppressing noise caused by a drive operation of a drive device from an audio signal acquired by an image taking apparatus as described above. These methods are intended to perform noise level estimation and noise suppression during the operation period of the drive device.

SUMMARY

Hereafter, the operation period of the drive device will be examined. For example, the drive device starts driving in accordance with a zoom adjustment operation, shutter press operation, or the like of the user. In this case, the user operation can be said to be a drive instruction. Depending on the image taking apparatus, the control unit or the like may issue a drive instruction in accordance with a user operation, and the drive device may start driving in accordance with the drive instruction from the control unit.

In any case, the drive device starts driving in accordance with the drive instruction. There is a delay time between the timing of the drive instruction and the timing when the drive device starts driving. Since driving has yet to be started in the period corresponding to this delay time, there is no noise caused by driving.

Accordingly, in performing noise level estimation and noise suppression during the operation period of the drive device, inclusion of the period corresponding to the delay time in the operation time of the drive device disadvantageously hampers proper noise level estimation and noise suppression. Specifically, if the noise level is estimated from the signal present in the period including the period during which no noise actually occurs, the estimated noise level will be excessively low. This prevents sufficient suppression of noise from the signal present in the period during which noise occurs. Further, if the noise is suppressed from the signal present in the period during which no noise occurs, audio quality will be degraded unexpectedly.

The noise is still low immediately after the drive device starts driving. The noise gradually increases with time and reaches an approximately constant value after a predetermined period. For this reason, if the period immediately after the drive device starts driving is included in the period with respect to which noise level estimation and noise suppression are performed, the estimated noise level is excessively high for the period immediately after the drive device starts driving and excessively low for the following period. Thus, the noise cannot be suppressed properly.

Depending on the drive device, the noise may be maximized immediately after driving is started, then gradually decrease, and reach an approximately constant value after a predetermined period. In this case, if the period immediately after the drive device starts driving is included in the period with respect to which noise level estimation and noise suppression are performed, the estimated noise level will be excessively low for the period immediately after the drive device starts driving and excessively high for the following period. Thus, the noise cannot be suppressed properly.

Thus, the improper setting of the start point of the period with respect to which noise level estimation and noise suppression are performed disadvantageously hampers proper noise suppression.

The drive stop mechanism is roughly classified into two patterns, although it varies depending on the type of the image taking device or mechanism. One of the patterns is a pattern where the drive device stops driving in accordance with a drive stop instruction. The other pattern is a pattern where no drive stop instruction is issued and the drive device automatically stops driving. As with a drive instruction, there are two types of drive stop instruction: an operation itself performed by the user; and a drive stop instruction issued by the control unit.

In any pattern, even when the drive device stops driving, the rotation of the motor or the like for driving is not immediately completely stopped. Accordingly, the noise is still present immediately after the drive device stops driving. This noise gradually decreases from the above-mentioned approximately constant value with time.

For this reason, if the period between the point in time when the drive device stops driving and the point in time when the noise completely disappears is included in the period with respect to which noise level estimation and noise suppression are performed, the above-mentioned problem will occur as well.

An advantage of the present invention is to provide a technology for properly suppressing noise caused by an operation of a drive device from an audio signal.

A first aspect of the present invention is an audio processing device that suppresses noise from an audio signal acquired by an audio acquisition apparatus. The audio acquisition apparatus includes a predetermined component and a drive unit for driving the component. The audio processing device according to the first aspect of the present invention is intended to suppress noise caused by the driving of the component by the drive device from an audio signal acquired by the audio acquisition apparatus. The audio processing device includes a noise period setting unit, a noise estimation unit, and a noise suppression unit.

The noise period setting unit sets a second period in an audio signal. The noise estimation unit estimates a noise level using the signal present in the second period set by the noise period setting unit. The noise suppression unit suppresses the noise from the signal present in the second period using the noise level estimated by the noise estimation unit.

"The second period" refers to an interval between the point in time when a predetermined first period elapses since the timing when a drive instruction is made to the drive unit and the point in time when the drive unit stops the driving according to the drive instruction.

A second aspect of the present invention is an audio acquisition apparatus. This audio acquisition apparatus includes a predetermined component, a drive unit that drives the component, an audio signal acquisition unit that acquires an audio signal, and a recording unit.

The recording unit adds, to a audio signal acquired by the audio signal acquisition unit, information indicating the timing where a drive instruction is issued to the drive device during acquisition of the audio signal and information which can indicate the point in time when the drive device stops the driving according to the drive instruction, and records the resulting signal.

Further, the replacement of the audio processing device or the audio acquisition apparatus according to the above-mentioned aspects with a method, system, or the like, a program product for causing a computer to perform the above-mentioned method, and an apparatus or the like including the audio processing device or audio acquisition apparatus are also effective as aspects of the present invention.

According to the technology of the present invention, noise caused by a drive operation of the drive unit included in the audio acquisition apparatus can be suppressed properly.

DETAILED DESCRIPTION

Figure 1:
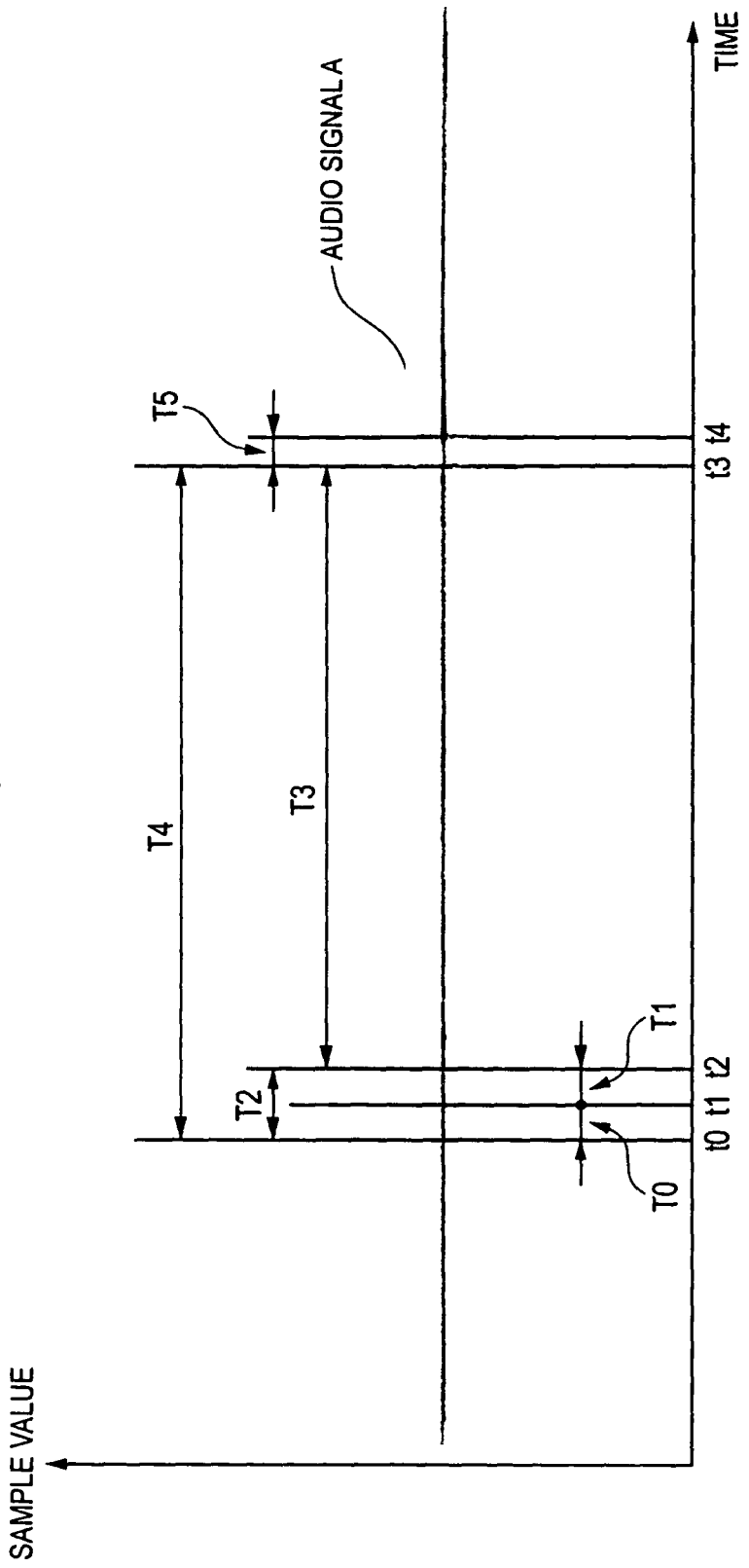
FIG. 1 is a diagram showing the principles of the technology of the present invention.

For the sake of clarity, the following description and the accompanying drawings are omitted or simplified as appropriate. It will be understood by those skilled in the art that the components shown in the drawings as function blocks for performing various processes can be realized by hardware such as a CPU, a memory, and other circuits or software such as a program or the like loaded into the memory, or a combination thereof. Accordingly, the function blocks are not limited to one of hardware and software. In the drawings, same components are assigned same numerals, and repeated description thereof will be omitted as appropriate.

The above-mentioned program may be stored in any type of non-transitory computer-readable medium and provided to a computer thereby. Such non-transitory computer-readable media include various types of tangible storage media. Examples of such a tangible storage medium include magnetic storage media (e.g., flexible disks, magnetic tapes, hard disk drives), magneto-optical storage media (e.g., magneto-optical disks), compact disc read-only memories (CD-ROMs), compact disc recordables (CD-Rs), compact disc rewritables (CD-R/Ws), semiconductor memories (e.g., mask ROMs, programmable ROMs (PROMs), erasable PROMs (EPROMs), flash ROMs, and random access memories (RAMs). Alternatively, the program may be provided to a computer by any type of transitory computer-readable medium. Examples of the transitory computer-readable medium include electric signals, optical signals, and electromagnetic waves. The transitory computer-readable medium can provide the program to the computer via a wired communication path such as an electric line or optical fiber or via a wireless configuration path.

Before describing the specific embodiments of the present invention, the principles of the technology of the present invention will be described with reference to FIG. 1. In the following description, "the timing of a drive instruction" refers to one of the timing at which a drive instruction is issued or the timing at which a drive instruction is received.

In FIG. 1, the horizontal axis represents the time, and the vertical axis represents the sample value of an audio signal A. The audio signal A is acquired by an audio acquisition apparatus such as an audio recording apparatus or image recording apparatus. The audio acquisition apparatus includes a drive device and a predetermined component. During the acquisition, the drive device drives the component, and noise caused by the driving enters the audio signal A.

In FIG. 1, a timing t0 is the timing of a drive instruction. Upon receipt of the drive instruction, the drive device starts driving the component. There is a delay time between the timing of the drive instruction and the timing when the drive device starts driving. In the graph, a timing t1 is the timing when the drive device starts driving.

As shown, noise does not occur between the timing t0 and the timing t1 and starts occurring at the timing t1. This noise gradually increases and reaches a predetermined level at a timing t2. The period between the timing t0 and the timing t1 and the period between the timing t1 and the timing t2 are set as a period T0 and a first period T1, respectively. The period obtained by combining the period T0 and the first period T1 is set as a period T2.

The drive device stops driving at a timing t3. As shown, the noise level is approximately constant over the period between the timing t2 and the timing t3 (period T3).

The noise gradually decreases from the timing when the drive device stops driving (timing t3) and disappears at a timing t4. The period between the timing t3 and the timing t4 is set as a period T5.

Thus, when the drive device drives the component during the acquisition of a audio signal by the audio acquisition apparatus, the period between the timing of the drive instruction (timing t0) and the point in time when the driving according to the drive instruction is stopped (timing t3) (period T4) in the acquired audio signal includes the no-noise period (period T0), the low-noise-level period (period T1), and the approximately-constant-noise-level period (period T3). The period further includes the low-noise-level period (period T5) immediately following the point in time when the drive device stops driving (timing t3).

With regard to the audio signal A as described above, the technology of the present invention estimates a noise level using the signal present in a second period of the period T4, that is, in the period between the point in time when a predetermined first period elapses since the timing t0 and the timing t3 when the drive device stops driving and suppresses the noise from the signal present in the second period using the estimated noise level. Hereafter, the first and second periods will be described.

First Case: First Period=Period T0

In this case, the second period is composed of the period T1 and the period T3. That is, the technology of the present invention sets the period obtained by subtracting the no-noise period T0 from the period T4 as the second period, estimates a noise level using only the signal present in the second period, and suppresses the noise from the signal present in the second period using the estimated noise level.

Thus, the period during which the signal is subjected to noise level estimation and noise suppression does not include the no-noise period T0. This can avoid noise suppression on the signal present in the period T0, which should not be subjected to noise suppression, as well as can reduce insufficient noise suppression on the signal present in the periods and T3 and T4.

Second Case First Period="Period T0+Period T1"

In this case, the second period is composed of only the period T3. That is, the technology of the present invention sets the period obtained by subtracting not only the period T0 but also the low-noise period T1 from the period T4 as the second period, estimates a noise level using only the signal present in the second period, and suppresses the noise from the signal present in the second period using the estimated noise level.

Thus, the period during which the signal is subjected to noise level estimation and noise suppression do not include any of the no-noise period T0 and the low-noise-level period T1. This can further reduce insufficient noise suppression on the signal present in the period T3.

In this case, the signal present in the period T1 does not need to be subjected to noise level estimation or noise suppression, since the period T1 is short and the noise level is low during that period. However, to improve audio quality, the signal present in the period T1 is also preferably subjected to noise level estimation and noise suppression. In this case, the signal present in the period T1 and the signal present in the period T3 are separately subjected to noise level estimation and noise suppression. Specifically, a noise level is estimated using only the signal present in the period T1, and a noise level is estimated using only the signal present in the period T3. Subsequently, the signal present in the period T1 and the signal present in the period T3 are subjected to noise suppression using the respective noise levels estimated from themselves.

Further, in any of the first and second cases, the signal present in a period T5 between the time point when the drive device stops driving (timing t3) and the time point when the noise disappears (timing t4) is also preferably subjected to noise level estimation and noise suppression. In this case, a noise level is estimated using only the signal present in the period T5, and the noise is suppressed from the signal present in the period T5 using the estimated noise level.

Thus, the noise is suppressed from the signal present in the period T5. Accordingly, audio quality can be further improved. Since the signal present in the period preceding the timing t3 (only the period T3 or "the period T1+the period T3") and the signal present in the period T5 are separately subjected to noise level estimation and noise suppression, the respective processes do not influence each other. Accordingly, the noise can be suppressed properly.

Hereafter, the method for setting the periods will be described. The periods required to be set vary between the above-mentioned cases. The setting of a period refers to the setting of the start and end points of the period.

In the above-mentioned first case, that is, in the case where "the period T2+the period T3" is set as the second period, a noise level is estimated using the signal present in the second period, and the noise is suppressed from the signal present in the second period using the estimated noise level. In this case, the timings t0, t1, and t3 need to be set.

In the second case, that is, in the case where the period T3 is set as the second period, the timings t0, t2, and t3 need to be set. If the signal present in the period T2 is also subjected to noise level estimation and noise suppression in the second case, the timing t1 also need to be set.

Further, if the signal present in the period T5 is also subjected to noise level estimation and noise suppression, the timing t4 also need to be set.

Hereafter, the method for setting timings will be described. Timings required to specify a period are preferably set using this method. The setting of timings varies between the case where the processes are performed in real time and the case where the processes are performed on an already acquired signal. "Perform the processes in real time" refers to performing noise level estimation and noise suppression on an audio signal being acquired by the audio acquisition apparatus. First, the case where the processes are performed in real time will be described.

Setting Timing t0

The timing t0 is the timing of a drive instruction. The timing when a user operation corresponding to the drive instruction is performed, the timing when the drive instruction is issued by the control unit, or the timing when the drive device receives the drive instruction is used as the timing t0.

Setting Timing t1

The timing t1 is the timing when the drive device starts driving.

Based on the timing of the drive instruction, the designer of the audio acquisition apparatus can set the time length between the timing of the drive instruction and the time point when the drive device starts driving (delay time). Alternatively, the designer can previously set the delay time, since the designer can grasp it on the basis of a simulation or the like. Alternatively, the designer may set a routine delay time of this type.

Accordingly, the time point when a predetermined time length (delay time) elapses since the drive instruction timing t0 is set as the timing t1.

Instead of setting the timing t1 on the basis of a predetermined delay time, it is possible to estimate the noise level from the timing t0 and set the time point when the estimated noise level reaches a predetermined threshold as the timing t1. Since this threshold is intended to determine the noise level at the point in time when noise starts occurring, it is preferably set to, for example, a value slightly greater than the signal level during the no-noise period.

Setting Timing t2

The timing t2 is the time point when the noise reaches an approximately constant level after the drive device starts driving.

The length from the timing t0 to the timing t2 is longer than the delay time. As with the delay time, the length can be set previously. Accordingly, the time point when a predetermined time length elapses since the drive instruction timing t0 can be set as the timing t2.

If both the timings t1 and t2 need to be set, the timing point when a first length, which is set for the timing t1, elapses since the timing t0 and the timing point when a second length, which is set for the timing t2, elapses since the timing t0 can be set as the timing t1 and the timing t2, respectively.

Alternatively, it is possible to preset the length starting from the timing t0 (first length) for the timing t1 and preset the length starting from the timing t1 (second length) for the timing t2 and set the timing point when the first length elapses since the timing t0 and the timing point when the second length elapses since the timing t1 as the timing t1 and the timing t2, respectively.

Instead of setting the timing t2 on the basis of a preset length, it is possible to estimate the noise level from the timing t0 or timing t1 and set the point in time when the estimated noise level reaches a predetermined threshold as the timing t2. As a matter of course, this threshold is set so that it is higher than a threshold for setting the timing t1.

Setting Timing t3

The timing t3 is the timing when the drive device stops driving. Where the drive device stops driving automatically, the point in time when the drive device stops driving is set as the timing t3.

Where the drive device stops driving in accordance with a drive stop instruction based on a user operation or a drive stop instruction issued by the control unit or the like, the point in time when the drive device stops driving may be set as the timing t3 as well. Alternatively, the point in time when a predetermined time length elapses since the point in time when the drive stop instruction is issued may be set as the timing t3.

Setting Timing t4

The timing t4 is the timing when the noise disappears after the drive device stops driving. The point in time when a predetermined time length elapses since the timing t3 is set as this timing.

Alternatively, it is possible to estimate the noise level from the timing t3 and set the point in time when the estimated noise level decreases to a predetermined threshold as the timing t4. As with the threshold used to set the timing t1, a value slightly greater than the signal level during the no-noise period is preferably set as this threshold.

While the method for first setting the timing t3 and then setting the timing t4 has been described, first, it is also possible to first set the timing t4 and then set the timing 3.

Method for First Setting Timing 4 and Then Setting Timing 3

In this case, the noise level is estimated from the already set timing t2. The point in time when the estimated noise level decreases to a predetermined threshold is set as the timing t4. This predetermined threshold is set to a value greater than the above-mentioned threshold for setting the timing t4 by estimating the noise level from the timing t3.

After setting the timing t4, the point in time preceding the timing t4 by a predetermined time is set as the timing t3.

In this case, the noise level estimated at the timing t4 is estimated from the signal present in the period T3 and the signal present in the period T5. Accordingly, use of this noise level to suppress the noise from the signal present in the period T3 results in insufficient suppression of the noise. In contrast, use of this noise level to suppress the noise from the signal present in the period T5 results in excessive suppression of the noise. For this reason, after setting the timings t3 and t4, it is necessary to abandon the noise level estimated from the timing t2, estimate the respective noise levels of the signal present in the period between the timing t2 and the timing t3 (period T3) and the signal present in the period between the timing t3 and the timing t4 (period T5), and suppress the noise from the signals present in the respective periods using the respective estimated noise levels.

Alternatively, in estimating the noise level from the timing t2 to set the timing t4, estimations (noise levels) up to each point in time when a predetermined time length (e.g., several tens of milliseconds) elapses are stored. After setting the timing t4 and then timing t3, the noise is suppressed from the signal present in the period T3 using the estimations up to the timing t3 of the temporarily stored estimations as the noise level in the period T3. As for the period T5, the noise level is estimated from the timing t3 again, and the noise is suppressed from the signal present in that period using the estimated noise level.

The method for setting the periods in the case where the processes are performed in real time has been described above. Before describing the case where the processes are performed on an already acquired audio signal, the audio acquisition technology of the present invention will be described.

In recording a audio signal, the audio acquisition technology of the present invention adds, to the audio signal, information indicating the timing when an drive instruction is issued to the drive unit during acquisition of the audio signal and information which can indicate the timing when the drive unit stops driving according to the drive instruction and records the resulting signal.

"The information which can indicate the timing when the drive unit stops driving according to the drive instruction" may be information directly indicating the timing when the drive unit stops driving or information from which that timing can be calculated, for example, information indicating the timing of a drive stop instruction. In the case of information indicating the timing of a drive stop instruction, the point in time when a predetermined time length elapses since that timing is calculated as the timing when the drive device stops driving according to the drive instruction.

That is, an audio signal acquired by the audio acquisition technology of the present invention contains information indicating the timing of a drive instruction and information which can indicate the timing when the drive unit stops driving according to the drive instruction. Thus, the above-mentioned periods can be set based on the already acquired audio signal. Thus, according to the audio acquisition technology of the present invention, the audio processing technology of the present invention can be applied to not only the case when noise level estimation and noise suppression are performed in real time but also the case where these processes are performed on an already acquired audio signal. Thus, the noise can be suppressed properly.

Based on the above description, the specific embodiments of the present invention will be described.

First Embodiment

Figure 2:
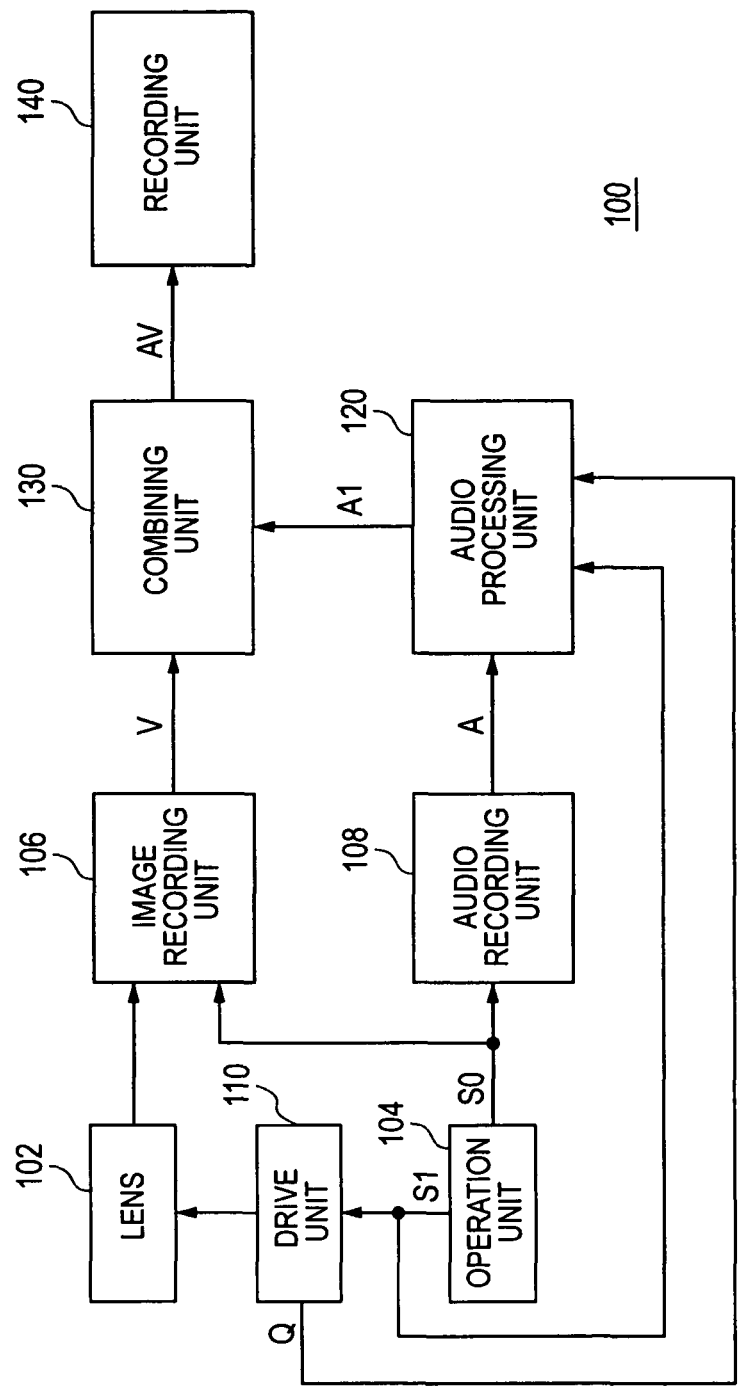
FIG. 2 is a diagram showing an image taking apparatus according to a first embodiment of the present invention.

FIG. 2 shows an image taking apparatus 100 according to a first embodiment of the present invention. The image taking apparatus 100 can take audio-accompanying moving images. It includes a lens 102, an operation unit 104, an image recording unit 106, an audio recording unit 108, a drive unit 110, an audio processing unit 120, a synthesizing unit 130, and a recording unit 140.

The operation unit 104 is a unit on which the user performs operations such as an image recording instruction, a focus operation, and a zoom operation.

The image recording unit 106 is coupled to the operation unit 104. It imports an image from the lens 102 in accordance with an image recording instruction S0 made by the user using the operation unit 104 and outputs an image signal V to the combining unit 130.

The audio recording unit 108 is coupled to the operation unit 104 and includes a microphone (not shown) or the like. The audio recording unit 108 imports a audio in accordance with the image recording instruction S0 made by the user using the operation unit 104 and outputs a audio signal A to the audio processing unit 120.

The drive unit 110 is coupled to the lens 102 and the operation unit 104. It starts driving the lens 102 in accordance with an operation requesting the driving of the lens 102 (hereafter referred to as "the drive instruction S1") among operations that the user may perform and subsequently stops driving automatically, for example, when a predetermined time elapses. The length of the predetermined time may vary depending on the type of the drive instruction S1.

The audio processing unit 120 is coupled to the audio recording unit 108. It suppresses noise caused by the drive operation of the drive unit 110 during the image recording from the audio signal A received from the audio recording unit 108 in real time. Thus, the audio processing unit 120 acquires an audio signal A2 and outputs it to the combining unit 130.

The combining unit 130 is coupled to the image recording unit 106 and the audio processing unit 120. It combines the image signal V from the image recording unit 106 and the audio signal A2 from the audio processing unit 120 to acquire a audio-accompanying moving-image signal (hereafter may be simply referred to as a "moving-image signal") AV. It then outputs the acquired signal to the recording unit 140.

The recording unit 140 is coupled to the combining unit 130. It includes a recording medium (not shown) such as a memory card and records the moving-image signal AV from the combining unit 130 in the recording medium.

In this embodiment, the audio processing unit 120 is also coupled to the operation unit 104 and the drive unit 110. The operation unit 104 outputs the drive instruction S1 not only to the drive unit 110 but also to the audio processing unit 120. When the drive unit 110 stops driving the lens 102, it outputs a stop signal Q indicating the stop to the audio processing unit 120.

Figure 3:
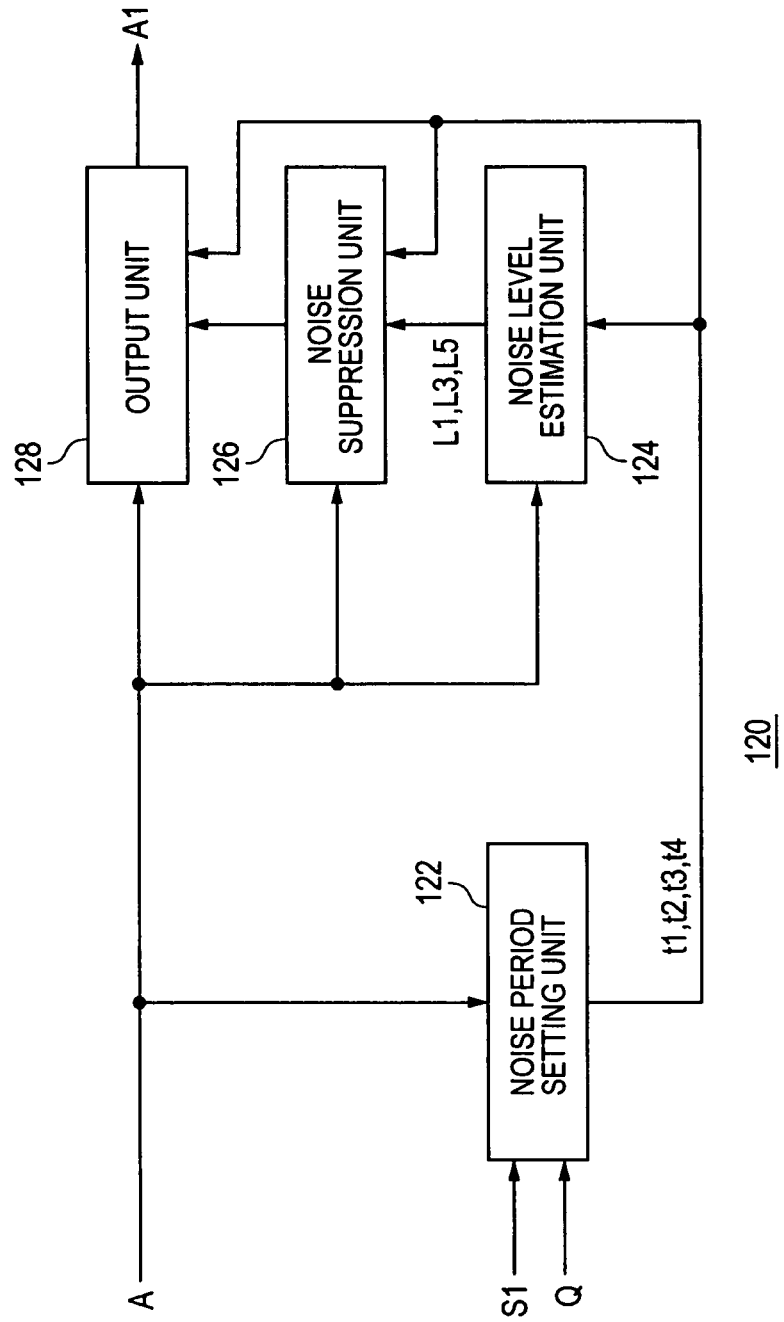
FIG. 3 is a diagram showing an audio processing unit included in the image taking apparatus shown in FIG. 1.

FIG. 3 shows the audio processing unit 120 of the image taking apparatus 100. The audio processing unit 120 includes a noise period setting unit 122, a noise level estimation unit 124, a noise suppression unit 126, and an output unit 128. The audio signal A from the audio recording unit 108 is inputted into these function blocks. In the description of the function blocks, it is assumed that the audio signal A from the audio recording unit 108 is the audio signal A shown in FIG. 1.

The noise period setting unit 122 receives the drive instruction S1 from the operation unit 104 and the stop signal Q and sets the timings t1, t2, t3, and t4 for the noise level estimation unit 124, the noise suppression unit 126, and the output unit 128.

When the noise period setting unit 122 receives the drive instruction S1, it starts measuring the time, considering the timing when it has received the instruction as the timing t0 in FIG. 1. When a predetermined first time length elapses, the noise period setting unit 122 outputs information indicating the start point of the period T1, that is, information indicating the timing t1 when the drive unit 110 starts driving, to the noise level estimation unit 124, the noise suppression unit 126, and the output unit 128.

The noise period setting unit 122 continuously measures the time. When a predetermined second time length longer, than the first time length elapses, the noise period setting unit 122 outputs information indicating the endpoint of the period T1 (=the start point of the period T3), that is, information indicating the timing t2 when the noise caused by the driving reaches an approximately constant level, to the noise level estimation unit 124, the noise suppression unit 126, and the output unit 128, as well as clears the measured time.

When the noise period setting unit 122 receives the stop signal Q, it outputs information indicating the timing when it has received that signal, to the noise level estimation unit 124, the noise suppression unit 126, and the output unit 128 as the endpoint of the period T3 (=the start point of the period T5), that is, as the timing t3 when the drive unit 110 stops driving and noise starts decreasing. Simultaneously, the noise period setting unit 122 starts measuring the time again.

When a predetermined third time length elapses since the restart of time measurement, the noise period setting unit 122 outputs information indicating the endpoint of the period T5, that is, information indicating the timing t4 when the noise disappears, to the noise level estimation unit 124, the noise suppression unit 126, and the output unit 128.

When the noise level estimation unit 124 receives the information indicating the timing t1 from the noise period setting unit 122, it starts estimating the noise level from the timing t1. Subsequently, when the noise level estimation unit 124 receives the information indicating the timing t2 from the noise period setting unit 122, it outputs the estimation of the noise level up to that time, a noise level L1, to the noise suppression unit 126. It also starts estimating the noise level of the signal from the timing t2 onward.

That is, at the timing t2, the noise level estimation unit 124 acquires the estimated noise level L1 from the audio signal A present in the period T1 and outputs the noise level L1 to the noise suppression unit 126, as well as starts estimating the noise level of the signal present in the period T3.

Subsequently, when the noise level estimation unit 124 receives the information indicating the timing t3 when the drive unit 110 stops driving from the noise period setting unit 122, it outputs the estimation of the noise level up to that time, a noise level L3, to the noise suppression unit 126. Simultaneously, it starts estimating the noise level of the signal from the timing t3.

That is, at the timing t3, the noise level estimation unit 124 acquires the estimated noise level L3 from the audio signal A present in the period T3 and outputs the noise level L3 to the noise suppression unit 126, as well as starts estimating the noise level of the signal present in the period T5.

Subsequently, when the noise level estimation unit 124 receives the information indicating the timing t4 when the noise disappears from the noise period setting unit 122, it outputs the estimation of the noise level up to that time, a noise level L5, to the noise suppression unit 126, as well as stops estimating the noise level.

That is, at the timing t4, the noise level estimation unit 124 acquires the noise level L5 estimated from the audio signal A present in the period T5 and outputs the noise level L1 to the noise suppression unit 126, as well as stops estimating the noise level.

The noise suppression unit 126 includes an internal buffer (not shown). When it receives the information indicating the timing t1 from the noise period setting unit 122, the noise suppression unit 126 stores the signal from the timing t1 onward in the internal buffer.

Subsequently, when the noise suppression unit 126 receives the information indicating the timing t2 from the noise period setting unit 122 and receives the noise level L1 estimated from the signal present in the period (T1) between the timings t1 and t2 from the noise level estimation unit 124, it suppresses the noise from the signal present in the period T1 using the noise level L1 and outputs the resulting signal to the output unit 128.

The output unit 128 includes an internal buffer (not shown) and stores the audio signal A in the internal buffer temporarily. Further, according to the pieces of information indicating the respective timings outputted by the noise period setting unit 122, it replaces the signals present in the corresponding periods with the signals from the noise suppression unit 126.

Specifically, the output unit 128 outputs the audio signal A as is until it receives the information indicating the timing t1. That is, the output unit 128 outputs the audio signal A up to the timing t1 to the combining unit 130 as is.

When the output unit 128 receives the information indicating the timing t1 from the noise period setting unit 122, it stores the audio signal A from the timing t1 temporarily.

Subsequently, when the output unit 128 receives the information indicating the timing t2 from the noise period setting unit 122 and receives the noise-suppressed signal present in the period T1 from the noise suppression unit 126, it outputs the noise-suppressed signal to the combining unit 130. It also discards the signal A present in the period between the timings t1 and 2 (period T1) temporarily stored in the internal buffer.

Thus, the output unit 128 replaces the audio signal A present in the period T1 with the signal that has been subjected to noise suppression using the noise level L1 estimated from the audio signal A present in the period T1, and outputs the noise-suppressed signal to the combining unit 130.

Subsequently, when the output unit 128 receives the information indicating the timing t3 from the noise period setting unit 122 and receives the noise-suppressed signal present in the period T3 from the noise suppression unit 126, it outputs the noise-suppressed signal to the combining unit 130. It also discards the audio signal A present in the period between the timings t2 and t3 (period T3) temporarily stored in the internal buffer.

Thus, the output unit 128 replaces the audio signal A present in the period T3 with the signal that has been subjected to noise suppression using the noise level L3 estimated from the audio signal A present in the period T3, and outputs the noise-suppressed signal to the combining unit 130.

Subsequently, when the output unit 128 receives the information indicating the timing t4 from the noise period setting unit 122 and receives the noise-suppressed signal present in the period T5 from the noise suppression unit 126, it outputs the noise-suppressed signal to the combining unit 130. It also discards the audio signal A present in the period between the timings t3 and t4 (period T5) temporarily stored in the internal buffer.

Thus, the output unit 128 replaces the audio signal A present in the period T5 with the signal that has been subjected to noise suppression using the noise level L5 estimated from the audio signal A present in the period T5, and outputs the noise-suppressed signal to the combining unit 130.

From the timing t4 onward, the output unit 128 outputs the signal to the combining unit 130 as is until it receives from the operation unit 104 a subsequent drive instruction made to the drive unit 110.

Figure 4:
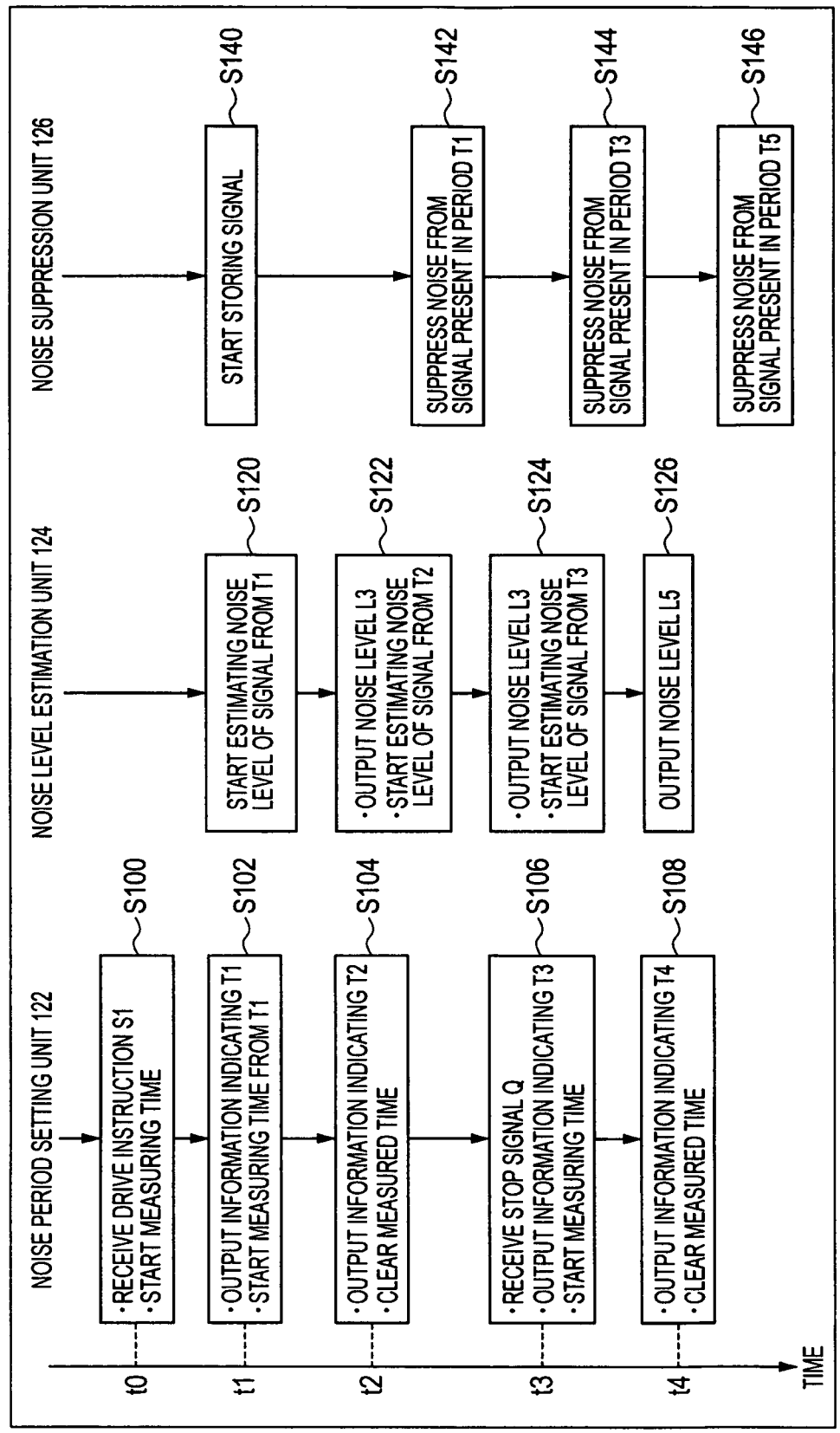
FIG. 4 is a flowchart showing the flow of the process performed by the audio processing unit shown in FIG. 3.

FIG. 4 includes flowcharts showing the flows of the processes performed by the noise period setting unit 122, the noise level estimation unit 124, and the noise suppression unit 126 of the audio processing unit 120 shown in FIG. 3. As shown, when the noise period setting unit 122 receives the drive instruction S1, it sets the timing when it has received the instruction as the timing t0 and starts measuring the time (S100).

When the predetermined first time length elapses, the noise period setting unit 122 outputs the information indicating the timing t1, as well as clears the measured time and starts measuring the time again (S102).

When the noise level estimation unit 124 receives the information indicating the timing t1 from the noise period setting unit 122, it starts estimating the noise level of the audio signal A from the timing t1 (S120).

When the noise suppression unit 126 receives the information indicating the timing t1 from the noise period setting unit 122, it starts storing the audio signal A from the timing t1 onward (S140).

When the predetermined second time length elapses since the timing t1, the noise period setting unit 122 outputs the information indicating the timing t2, as well as clears the measured time (S104).

When the noise level estimation unit 124 receives the information indicating the timing t2 from the noise period setting unit 122, it outputs the estimation of the noise level up to that time, that is, the noise level L1 estimated from the signal present in the period T1 (between the timings t1 and t2) to the noise suppression unit 126. It also starts estimating the noise level of the audio signal A from the timing t2 onward (S122).

When the noise suppression unit 126 receives the information indicating the timing t2 from the noise period setting unit 122 and receives the noise level L1 from the noise level estimation unit 124, it suppresses the noise from the stored audio signal A present in the period T1 using the noise level L1 and outputs the resulting signal to the output unit 128 (S142).

When the noise period setting unit 122 receives the stop signal Q from the drive unit 110, it sets the timing when it has received that signal as the timing t3 and outputs the information indicating the timing t3, as well as starts measuring the time again (S106).

When the noise level estimation unit 124 receives the information indicating the timing t3 from the noise period setting unit 122, it outputs the estimation of the noise level up to that time, that is, the noise level L3 estimated from the signal present in the period T3 (between the timings t2 and t3) to the noise suppression unit 126. It also starts estimating a noise level using the audio signal A present in the period starting from the timing t3 (S124).

When the noise suppression unit 126 receives the information indicating the timing t3 from the noise period setting unit 122 and receives the noise level L3 from the noise level estimation unit 124, it suppresses the noise from the stored audio signal A present in the period T3 using the noise level L3 and outputs the resulting signal to the output unit 128 (S144).

When the predetermined time length elapses since the timing t3, the noise period setting unit 122 outputs the information indicating the timing t4, as well as clears the measured time (S108). Subsequently, the noise period setting unit 122 waits until it receives a drive instruction S1 again.

When the noise level estimation unit 124 receives the information indicating the timing t4 from the noise period setting unit 122, it outputs the estimation of the noise level up to that time, that is, the noise level L5 estimated from the signal present in the period T5 (between the timings t3 and t4) to the noise suppression unit 126 (S126). Subsequently, the noise level estimation unit 124 waits until it receives information indicating the timing t1 from the noise period setting unit 122 again.

When the noise suppression unit 126 receives information the indicating the timing t4 from the noise period setting unit 122 and receives the noise level L5 from the noise level estimation unit 124, it suppresses the noise on the stored audio signal A present in the period T5 using the noise level L5 and outputs the resulting signal to the output unit 128 (S146). Subsequently, the noise suppression unit 126 waits until it receives information indicating the timing t1 from the noise period setting unit 122 again.

According to the image taking apparatus 100, noise suppression is not performed on the audio signal A present in the period T0 as shown in FIG. 1, that is, on the audio signal A present in the period up to the timing t1 when the drive unit 110 starts driving immediately after the drive instruction. On the other hand, noise suppression is performed on the signal present in the period T1, that is, on the signal present in the period between the timing t1 when the drive unit 110 starts driving and the point in time when the noise becomes approximately constant (timing t2) using the noise level estimated from the signal present in that period. Further, noise suppression is performed on the signal present in the period T3, that is, on the signal present in the period between the point in time when the noise caused by driving by the drive unit 110 becomes approximately constant and the timing t3 when the drive unit 110 stops driving, using the noise level estimated from the signal present in that period. Further, noise suppression is performed on the signal present in the period T5, that is, on the signal present in the period between the timing t3 when the drive unit 110 stops driving and the point in time when the noise disappears (timing t4), using the noise level estimated from the signal present in that period.

This can avoid noise suppression on the signal present in the period on which noise suppression should not be performed, as well as can reduce excessive or insufficient noise suppression. Thus, better audio quality can be obtained.

Second Embodiment

Figure 5:
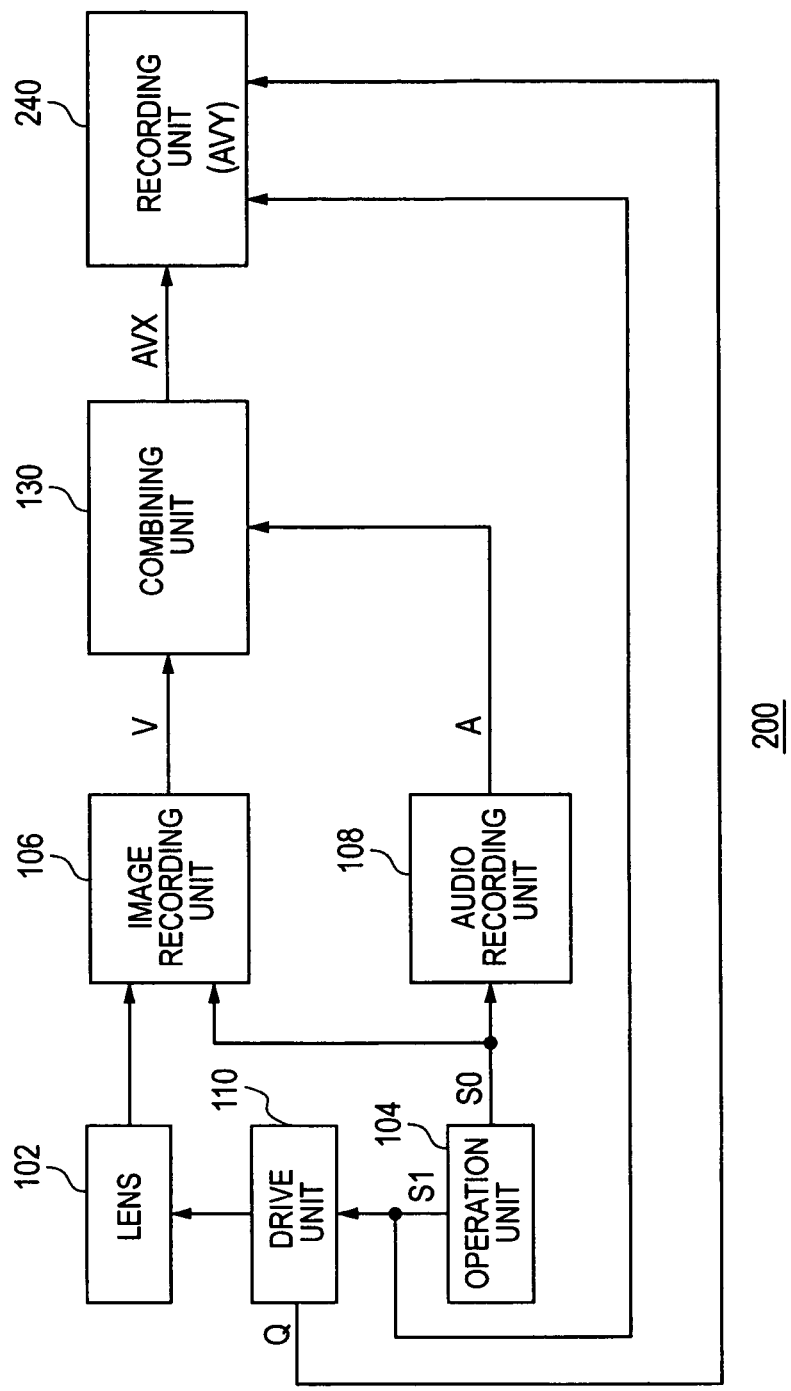
FIG. 5 is a diagram showing an image taking apparatus according to a second embodiment of the present invention.

FIG. 5 shows an image taking apparatus 200 according to a second embodiment of the present invention. The image taking apparatus 200 can take audio-accompanying moving images. It includes the lens 102, the operation unit 104, the image recording unit 106, the audio recording unit 108, the drive unit 110, the combining unit 130, and a recording unit 240. The image taking apparatus 200 does not include the audio processing unit 120 included in the image taking apparatus 100 and includes the recording unit 240 instead of the recording unit 140 of the image taking apparatus 100.

In the image taking apparatus 200 according to this embodiment, the operation unit 104 sends a drive instruction S1 to the drive unit 110 as well as to the recording unit 240. The drive unit 110 sends a stop signal Q to the recording unit 240.

The combining unit 130 receives an image signal V acquired by the image recording unit 106 and a audio signal A acquired by the audio recording unit 108. The combining unit 130 combines the image signal V and the audio signal A to acquire a moving-image signal and outputs the moving-image signal to the recording unit 240. An audio signal included in the moving-image signal acquired by the combining unit 130 has yet to be subjected to suppression of noise caused by driving. To distinguish this audio signal from the moving-image signal AV acquired by the combining unit 130 of the image taking apparatus 100, it is represented by AVX.

The recording unit 240 adds, to the moving-image signal AVX received from the combining unit 130, information indicating the timing of the drive instruction S1 (the timing t0 in FIG. 1) from the operation unit 104 and information indicating the timing of the stop signal Q (the timing t3 in FIG. 1) from the drive unit 110 and records the resulting signal in a recording medium (not shown). The moving-image signal recorded in the recording medium is represented by AVY.

That is, the moving-image signal AVY acquired by the image taking apparatus 200 according to the second embodiment contains the timing when the drive instruction is made to the drive unit 110 and the timing when the drive unit 110 stops driving according to the drive instruction. Accordingly, in performing noise level estimation and noise suppression on the signal later, it is possible to set the periods shown in FIG. 1. Thus, noise can be suppressed properly.

The process of suppressing noise from the moving-image signal AVY acquired by the image taking apparatus 200 will be described using a third embodiment.

Third Embodiment

Figure 6:
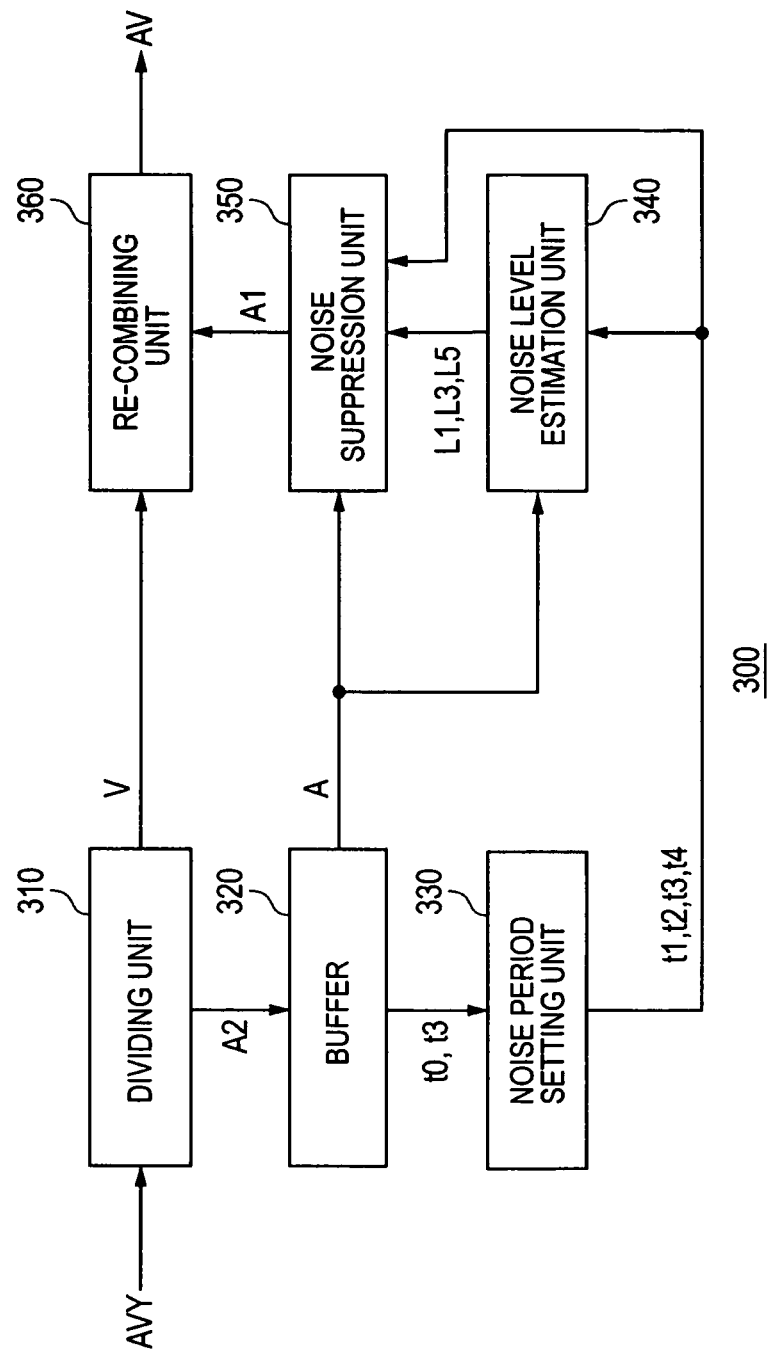
FIG. 6 is a diagram showing an audio processing device according to a third embodiment of the present invention.

FIG. 6 shows an audio processing device 300 according to a third embodiment of the present invention. The audio processing device 300 is intended to suppress noise caused by the driving by the drive unit of the image taking apparatus 200 from the moving-image signal AVY acquired by the image taking apparatus 200 shown in FIG. 5. It includes a dividing unit 310, a buffer 320, a noise period setting unit 330, noise level estimation unit 340, a noise suppression unit 350, and a re-combining unit 360.

The dividing unit 310 divides the moving-image signal AVY into an image and an audio to acquire image signal V and audio signal A2. The dividing unit 310 outputs the image signal V to the re-combining unit 360 and outputs the audio signal A2 to the buffer 320.

As described above, the moving-image signal AVY contains the information indicating the timing of the drive instruction and the information indicating the timing when the driving is stopped. These pieces of information are contained in the audio signal A2. That is, the audio signal A2 contains the audio signal A shown in FIG. 1 and the pieces of information indicating the timings t0 and t3.

The noise period setting unit 330 reads the pieces of information indicating the timings t0 and t3 from the audio signal A2 temporarily stored in the buffer 320 and calculates the timings t1, t2, and t4 shown in FIG. 1 from the pieces of information. The noise period setting unit 330 then outputs the pieces of information indicating the timings t1, t2, t3, and t4 to the noise level estimation unit 340.

The method for setting the timings is the same as the method used by the noise period setting unit 122 of the audio processing unit 120 in the image taking apparatus 100 and will not be described in detail.

When the noise level estimation unit 340 receives the pieces of information indicating the timings t1, t2, t3, and t4 from the noise period setting unit 330, it estimates the respective noise levels with respect to the periods T1, T3, and T5 of the audio signal A contained in the audio signal A2 stored in the buffer 320. The noise level estimation unit 340 then outputs to the noise suppression unit 350 the noise level L1 estimated from the signal present in the period T1, the noise level L3 estimated from the signal present in the period T3, and the noise level L5 estimated from the signal present in the period T5.

The noise suppression unit 350 reads the audio signal A contained in the audio data A2 stored in the buffer 320, suppresses the noise from the audio signal A as appropriate, and outputs the resulting signal to the re-combining unit 360.

Specifically, the noise suppression unit 350 outputs the audio signal A up to the timing t1 to the re-combining unit 360 as is. With regard to the audio signal A from the timing t1 to the timing t2 (period T1), the noise suppression unit 350 suppresses the noise from it using the noise level L1 received from the noise level estimation unit 340 and outputs the resulting signal to the re-combining unit 360. With regard to the audio signal A from the timing t2 to the timing t3 (period T3), the noise suppression unit 350 suppresses the noise from it using the noise level L3 received from the noise level estimation unit 340 and outputs the resulting signal to the re-combining unit 360. With regard to the audio signal A from the timing t3 to the timing t4 (period T5), the noise suppression unit 350 suppresses the noise from it using the noise level L5 received from the noise level estimation unit 340 and outputs the resulting signal to the re-combining unit 360. With regard to the audio signal A from the timing 4 onward, the noise suppression unit 350 outputs it to the re-combining unit 360 as is.

The re-combining unit 360 re-combines the image signal V from the dividing unit 310 and the audio signal A1 from the noise suppression unit 350 to acquire moving-image signal AV.

The audio processing device 300 according to this embodiment differs from the audio processing unit 120 of the image taking apparatus 100 according to the first embodiment shown in FIG. 2 in that noise level estimation and noise suppression are performed on an already acquired audio signal rather than performing these processes on a audio signal being acquired in real time. Except for this point, the audio processing device 300 is the same as the audio processing unit 120 in other points such as the processes performed by the function blocks and can obtain the same advantages as those of the audio processing unit 120.

The present invention has been described based on the embodiments. These embodiments are only illustrative, and various changes, additions, or deletions may be made thereto without departing from the spirit of the invention. It will be understood by those skilled in the art that any modifications resulting from changes, additions, or deletions falls within the scope of the invention.

For example, the timings (periods) are set based on the predetermined time lengths in the above-mentioned first and third embodiments; however, the other methods described in the explanation of the principles of the technology of the present invention may be used to set the timings or periods.

Further, noise level estimation and noise suppression are performed on the signals present in the periods T1, T3, and T5 in the first and third embodiments; however, noise level estimation and noise suppression on the signal present in the period T1, the signal present in period T5, or both thereof may be omitted. Further, instead of separately performing noise level estimation and noise suppression on the signal present in the period T1 and the signal present in the period T3, these processes may be performed on the signal present in a period obtained by combining the periods T1 and T3.

In the second embodiment, the timing t3 itself is added to the audio signal as information which can indicate the timing t3 when the driving is stopped; however, instead of the timing t3, another information from which the timing t3 can be calculated, for example, information indicating the timing of the drive stop instruction may be added to the audio signal.

For example, in the first embodiment, the noise level estimation unit 124 performs noise level estimation on the signals present in the periods (the periods T1, T3, and T5 in FIG. 1) to be subjected to noise level estimation and, only after completing the estimation of the noise level up to the end of each period, outputs the noise level of that period to the noise suppression unit 126. The noise suppression unit 126 suppresses the noise from the signal present in that period using the noise level estimated by the noise level estimation unit 124. Alternatively, in order to increase the processing speed, the noise level estimation unit 124 may output the noise level estimated up to each point in time when a predetermined time length (e.g., several tens millimeters) elapses to the noise suppression unit 126, while the noise suppression unit 126 may suppresses the noise from the signal present in each predetermined time length each time it receives the noise level from the noise level estimation unit 124.

In the description of the principles of the technology of the present invention as well as in the description of the embodiments, the audio signal A shown in FIG. 1 has been used as an example of an audio signal to be processed. The technology of the present invention is also applicable to suppression of noise from an audio signal acquired by an audio acquisition apparatus including a drive device which allows the noise to be maximized immediately after it starts driving, gradually decrease, and reach an approximately constant value after a predetermined period.

What is claimed is:

1. An audio processing device for suppressing noise from an audio signal acquired by an audio acquisition apparatus, the audio acquisition apparatus including a predetermined component and a drive unit, the drive unit driving the component, the noise being caused by driving of the component by the drive unit, the audio processing device comprising:

a noise period setting unit that sets a second period with respect to the audio signal, the second period being an interval between the point in time when a predetermined first period elapses since the timing when a drive instruction is made to the drive unit and the point in time when the drive unit stops the driving according to the drive instruction;

a noise estimation unit that estimates a noise level using the signal present in the second period set by the noise period setting unit;

a noise suppression unit that suppresses the noise from the signal present in the second period using the noise level estimated by the noise estimation unit, wherein the noise period setting unit further sets a fourth period, the fourth period being an interval between the point in time when a third period elapses since the timing when the drive instruction is made to the drive unit and the endpoint of the first period, the fourth period falling within the first period, wherein the noise estimation unit further estimates a noise level using the signal present in the fourth period set by the noise period setting unit, and wherein the noise suppression unit further suppresses the noise from the signal present in the fourth period using the noise level of the signal present in the fourth period estimated by the noise estimation unit.

2. The audio processing device according to claim 1, wherein the drive unit comprises a drive unit that stops the driving in accordance with a drive stop instruction, and wherein the noise period setting unit sets the point in time when a predetermined time elapses since the timing of the drive stop instruction, as the endpoint of the second period.

3. An audio processing device for suppressing noise from an audio signal acquired by an audio acquisition apparatus, the audio acquisition apparatus including a predetermined component and a drive unit, the drive unit driving the component, the noise being caused by driving of the component by the drive unit, the audio processing device comprising:

a noise period setting unit that sets a second period with respect to the audio signal, the second period being an interval between the point in time when a predetermined first period elapses since the timing when a drive instruction is made to the drive unit and the point in time when the drive unit stops the driving according to the drive instruction;

a noise estimation unit that estimates a noise level using the signal present in the second period set by the noise period setting unit;

a noise suppression unit that suppresses the noise from the signal present in the second period using the noise level estimated by the noise estimation unit;

wherein the noise period setting unit further sets a fifth period, the fifth period being a predetermined period starting from the endpoint of the second period, the noise estimation unit further estimates a noise level using the signal present in the fifth period set by the noise period setting unit, and wherein the noise suppression unit further suppresses the noise from the signal present in the fifth period using the noise level of the signal present in the fifth period estimated by the noise estimation unit.

4. An audio processing method for suppressing noise from an audio signal acquired by an audio acquisition apparatus, the audio acquisition apparatus including a predetermined component and a drive unit, the drive unit driving the component, the noise being caused by driving of the component by the drive unit, the audio processing method comprising:

setting a second period with respect to the audio signal, the second period being an interval between the point in time when a first period elapses since the timing when a drive instruction is made to the drive unit and the point in time when the drive unit stops the driving according to the drive instruction;

estimating a noise level using the signal present in the set second period; and suppressing the noise from the signal present in the second period using the estimated noise level;

setting a fourth period, the fourth period being an interval between the point in time when a third period elapses since the timing when the drive instruction is made to the drive unit and the endpoint of the first period, the fourth period falling within the first period;

estimating a noise level using the signal present in the set fourth period; and suppressing the noise from the signal present in the fourth period using the estimated noise level of the signal present in the fourth period.

5. The audio processing method according to claim 4, wherein the drive unit comprises a drive unit that stops the driving in accordance with a drive stop instruction, and wherein in setting the second period, the point in time when a predetermined time elapses since the timing of the drive stop instruction is set as the endpoint of the second period.

6. An audio processing method for suppressing noise from an audio signal acquired by an audio acquisition apparatus, the audio acquisition apparatus including a predetermined component and a drive unit, the drive unit driving the component, the noise being caused by driving of the component by the drive unit, the audio processing method comprising:

setting a second period with respect to the audio signal, the second period being an interval between the point in time when a first period elapses since the timing when a drive instruction is made to the drive unit and the point in time when the drive unit stops the driving according to the drive instruction;

estimating a noise level using the signal present in the set second period; and suppressing the noise from the signal present in the second period using the estimated noise level;

setting a fifth period, the fifth period being a predetermined period starting from the endpoint of the second period;

estimating a noise level using the signal present in the set fifth period; and suppressing the noise from the signal present in the fifth period using the estimated noise level of the signal present in the fifth period.

* * * * *